Dec. 17, 1968 W. B. STONE, JR 3,416,269
AUTOMOTIVE SUPPORT STRUCTURE FOR INCREASING
THE CAPACITY OF PARKING LOTS
Filed Nov. 9, 1967 2 Sheets-Sheet 2
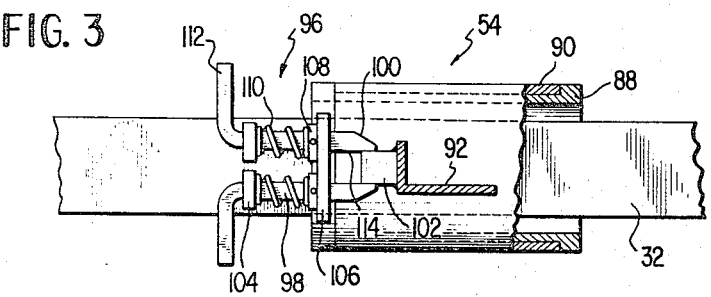
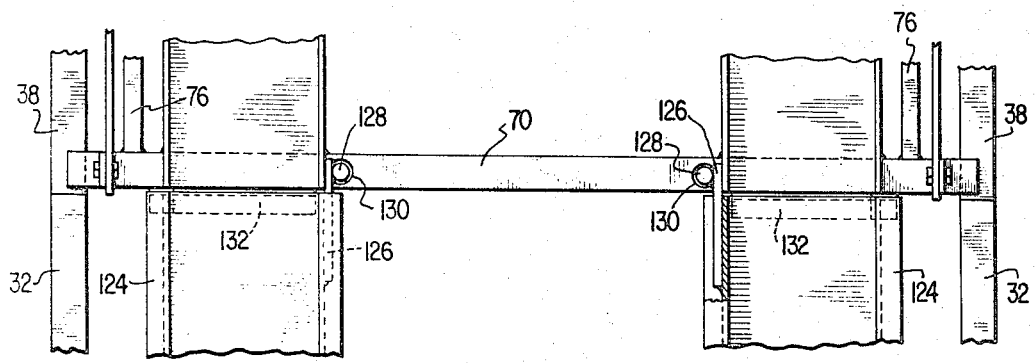
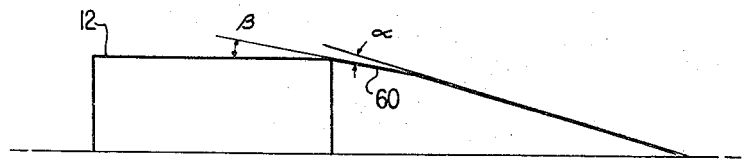
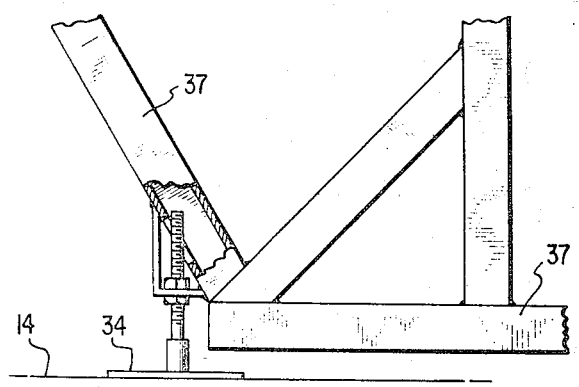
INVENTOR
WAYNE B. STONE, JR.
BY *Wayne B. Stone jr.*
ATTORNEY United States Patent Office 3,416,269
Patented Dec. 17, 1968

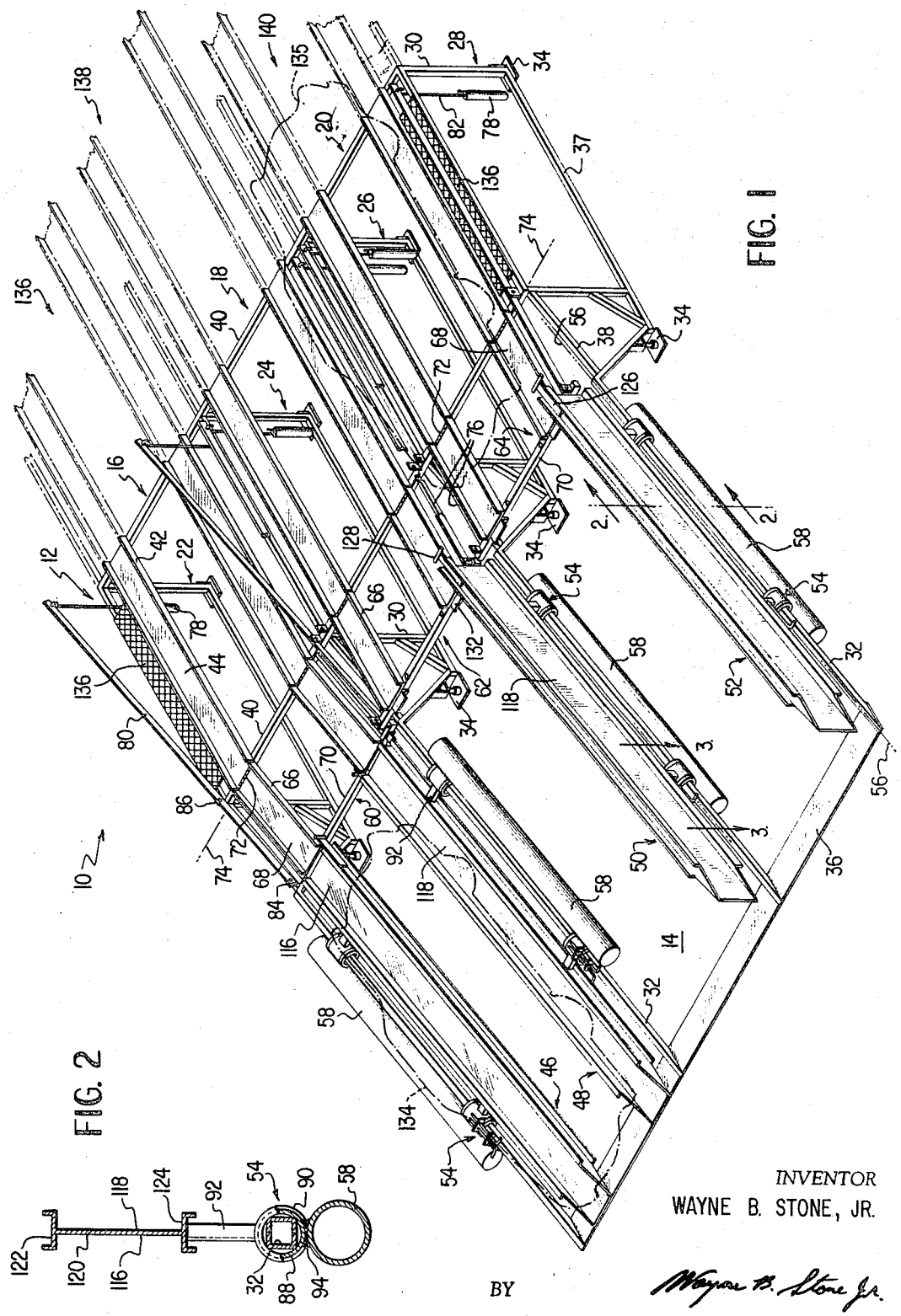

3,416,269
AUTOMOTIVE SUPPORT STRUCTURE FOR INCREASING THE CAPACITY OF PARKING LOTS
Wayne B. Stone, Jr., Kensington, Md., assignor of twenty-four and one-half percent each to G. Turner Moller, Lanham, and Edward L. Goldman, Bowie, Md.
Continuation-in-part of application Ser. No. 628,491, Apr. 4, 1967. This application Nov. 9, 1967, Ser. No. 681,771
17 Claims. (Cl. 52—175)

ABSTRACT OF THE DISCLOSURE

This invention relates to an improvement in automotive support structure including inclined ramps defining a path of automotive wheel travel over which an automobile may be driven to an elevated parking location after which time the ramps are moved transversely of their original position to permit a second automobile to be driven directly beneath the first automobile. The support members for the elevated parking location are transversely spaced a distance sufficient to accommodate the lower automobile. A plurality of the support structures will normally be positioned side-by-side permitting a plurality of automobiles to be parked in superposed relation to a like number of automobiles parked therebeneath. The improvement resides, primarily, in providing two wheel track supporting surfaces on at least one of the inclined ramps and so mounting the ramps on the support structure that one of the track surfaces may be used in conjunction with another ramp to support an automobile as it is driven to a first elevated parking position and thereafter moving the ramp so that its other track surface may coact with a different ramp to support an automobile as it is driven to a second elevated position adjacent the car parked in the first elevated position.

CROSS-REFERENCES TO RELATED APPLICATION

This application is a continuation-in-part of application Ser. No. 628,491 filed April 4, 1967.

BACKGROUND OF THE INVENTION

There are many areas of business such as parking lots, service stations, car rental facilities and automobile dealership agencies where it is necessary to park or store automobiles for various periods of time and in which the space available for this purpose is limited.

Prior attempts to increase the parking capacity of a given area have, in general, involved the use of parking buildings which require a large capital outlay and may not be feasible for small businesses.

The state of the prior art regarding previous attempts to produce single unit automotive support structures is set out in copending application Ser. No. 628,491.

Summary of the invention

It is an object of the invention to configure and mount a plurality of ramps in such a manner that each of the ramps may not only be used in conjunction with one or more additional ramps to define a path of automotive wheel travel whereby a car may be driven to an elevated parking level, but also to permit the same ramp to be moved to a different position where it may coact with at least one additional ramp to provide a different path of automotive wheel travel, transversely spaced from the first path of travel, to a different elevated location.

It is among the further objects of the invention to provide a drive-on parking device including ramp structures that may be manually positioned; to provide an automotive support structure that provides any desired number of longitudinally or transversely aligned elevated parking locations; and to provide a support structure that is very economical to manufacture and may be assembled on an installation site in a matter of minutes.

Description of the drawing

FIGURE 1 is a perspective view, partially broken away, illustrating the improved automotive support structure;
FIGURE 2 is a cross sectional view taken along the line 2—2 of FIGURE 1;
FIGURE 3 is a cross sectional view, with parts in elevation partly broken away, taken along the line 3—3 of FIGURE 1;
FIGURE 4 is a fragmentary top plan view of the juncture between the lower and upper ramps;
FIGURE 5 is a schematic representation of a slightly modified form of the invention; and
FIGURE 6 is a fragmentary detailed view of a portion of a support member.

Description of the preferred embodiments

In FIGURE 1 is depicted the improved automotive support structure 10 including upper parking level 12, positioned on a lower conventional parking level 14, such as a parking lot. The upper level includes individual transversely spaced elevated parking levels or locations 16, 18, 20, supported by transversely spaced support members 22, 24, 26, 28, in superposed spaced relation to automotive paths of movement defined between each adjacent pair of support members.

Each of the support members include generally upright and inclined framing members 30, 32 extending upwardly from lower base level supports 34, 36, respectively, and interconnected by appropriate bracing 37, 38. The base supports 34 may consist of plate-like feet or pads threadedly connected with the support members providing for vertical adjustment of the same as best shown in FIGURE 6. Base support 36 may consist of one or more elongated flat plates resting on lower parking level 14 to support the lower ends of inclined frame elements 32 or, alternatively, base support 36 may be dispensed with in which event the lower ends of frame members 32 will be supported directly on the lower parking level.

The individual parking levels or locations which comprise upper parking level 12 each include a pair of spaced channel members 42 providing automotive wheel track supporting surfaces 44. A drip pan, not shown, may be provided between channel members 42 to protect the cars parked on lower level 14 from drippage.

Longitudinally inclined ramps 46, 48, 50, 52 associated with support members 22, 24, 26, 28, respectively, are journaled on inclined frame members 32 by bearings 54 defining longitudinally inclined pivot axes 56 associated with each support member. Bearings 54 support ramps 46, 48, 50, 52 for pivotal movement through 180° about the respective longitudinally inclined axes 56. Hollow counterweights 58 are provided on the sides of inclined pivot axes 56 opposite ramps 46, 48, 50, 52 to counterbalance the same which are adapted to be manually pivoted about the respective pivot axes. Hollow counterweights 58 may contain any desired amount of a suitable ballast such as sand, water, or the like which may be introduced and withdrawn via filling and drain fittings, not shown. The manifest purpose of the counterweights 58 is to minimize the effort required by an operator to raise the ramps from the position illustrated in FIGURE 1 by ramps 46, 48 to the position illustrated by ramps 50, 52. Obviously, suitable spring means such as a helical or spiral spring positioned about the inclined supports 32 and having one end secured to the inclined support 32 and the other end secured to the respective ramp may be used to accomplish this purpose. Similarly, the counterweight 58 may be deleted if this problem is of no concern.

Each of the upper ramps 60, 62, 64 include a pair of channel members 66, defining wheel track supporting surfaces 68, overlying and rigidly connected to a transversely extending box beam 70. The ends of beam 70 extend beyond the lateral confines of the channel members to overlie bracing members 38 interconnecting the upright and inclined frame members 30, 32. Upper ramps 60, 62, 64 are pivotally mounted adjacent upper parking level 12, on pivots 72 defining coincident transverse pivot axes 74, for movement between a first position substantially parallel to inclined members 32 and a second position substantially parallel to parking level 12 as illustrated by the positions of ramps 60 and 62, respectively, in FIGURE 1. When the upper ramps are in the position of ramp 60 in FIGURE 1, the outer ends of the box beams are supported on the upper surfaces of the brace members 38 underlying the respective ends of the box. Bracing elements 76 are provided to impart additional rigidity to the upper ramps. Two bracing elements are associated with each upper ramp. Brace elements 76 are secured at one end thereof to the outer ends of the box beam and the other ends thereof are pivotally supported on pivots 72. Each upper ramp is biased toward the raised position illustrated by ramps 62 and 64 in FIGURE 1 by two counterweights 78 interconnected therewith by levers 80 and links 82. Levers 80 are connected to pivots 84 adjacent the rear end of the upper ramps 60, 62, 64 and to stationary pivots 86 mounted on the support structure just forward of pivot axes 74.

As illustrated in FIGURES 2 and 3, bearings 54 include an inner bearing member 88, secured in concentric relation to inclined frame members 32, journaling outer bearing members 90 for pivotal movement about axes 56. The longitudinally inclined ramps are fixedly secured to outer bearing 90 by arms 92 while the counterweights 58 may be secured directly to the outer bearing members as by weldment 94 at a position displaced 180° from the attachment point of arms 92.

Each of the longitudinally inclined ramps 46, 48, 50, 52 may be locked in the raised position, depicted by ramps 50 and 52 in FIGURE 1, by a spring biased latching mechanism 96 best illustrated in FIGURE 3. Latching mechanism 96 includes a pair of locking bars 98 having rectangular cross sections and cam faces 100 at the upper ends thereof to coact with bar 102 rigidly secured to ramp supporting arms 92. Locking bar guides 104, 106 secured to inclined frame member 32 and fixed internal bearing member 88, respectively, are provided with guide openings supporting latching bars 98 for reciprocal non-rotative movement. Collars 108 are secured to each locking bar between guides 104 and 106. Compression springs 110 reacting between lower guides 104 and collars 108 normally bias locking bars 98 to the locked position shown in FIGURE 3. The lower ends of the locking bars are bent outwardly away from axes 56 providing a handle or foot operated pedal release 112 for latching mechanism 96. FIGURE 3 illustrates the relationship of the latching means and lower ramp support arm when the ramp is in the raised position wherein bar 102 secured to arm 92 is locked between parallel sides 114 of locking bars 98. To lower the ramp, one of the handles 112 is pushed downwardly or to the left as viewed in FIGURE 3, to allow arm 92 and bar 102 to swing past the depressed bar latch. When handle 112 is released, spring 110 restores the depressed bar to the position of FIGURE 3. In order to again raise the ramp, it is rotated upwardly about the associated axes 56 and bar 102 engages the appropriate cam face 100 to depress latch bar 98 until bar 102 reaches the position of FIGURE 3 at which time spring 110 restores the depressed locking bar to the locked position.

Ramps 46, 48, 50, 52 are generally I-shaped in cross section which construction provides two wheel track supporting surfaces 116, 118 on either side of web 120 which joins the mid portions of channel guide flanges 122, 124.

The upper ends of longitudinally inclined ramps 46, 48, 50, 52 are provided with plate-like lugs 126 secured to the outer face of the guide flange remote from axes 56 and extending beyond the upper ends thereof to rest on the rear edges of upper ramps 60, 62, 64 when all of the ramps are in a lower load supporting position as illustrated by ramps 46, 48, and 60 in FIGURE 1. As best shown in FIGURE 4, each of the lugs has secured thereto at right angles to the length thereof a pin 128 each of whose ends project beyond lug 126 to engage an opening 130 appropriately positioned adjacent the rear edge of the upper ramps. Angle members 132 secured to the rear edge of the upper ramps 60, 62, 64 provide additional support for the upper ends of lower ramps 46, 48, 50, 52 engagement with the upper ends of channels 124 in the lower load supporting position of FIGURE 4.

With ramps 46, 48, and 60 in the lower position as shown in FIGURE 1, these three ramps intersect the automotive path of movement defined between frame members 22, 24 and define a substantially straight line path of automotive wheel travel along their upper surfaces 116, 118, 68 from lower parking level 14 to parking location 16 on upper parking level 12.

In some instances it may be desirable to decrease the breakover angle defined by the upper ramp surfaces 116, 118, 68 with respect to upper level 12 without increasing the overall length of the support structure. This may be accomplished in the manner indicated by the schematic showing of FIGURE 5 wherein the rear end of upper ramp 60 is supported slightly above the plane of the upper surface of frame elements 32 by suitable shimming elements inserted therebetween. The results of such a modified construction is illustrated in FIGURE 5 wherein the upper ramp 60 forms a slight angle with respect to the ramps 46, 48 rather then being substantially coplanar therewith, as in the embodiment of FIGURE 1, and a lesser angle is formed between the upper ramp and upper level 12 than in the previous embodiment.

In operation, the support structure shown in FIGURE 1 is positioned on lower parking level 14 which may be a conventional parking lot. In order to park a car in elevated location 20, and assuming the ramps 50, 52, and 64 to be in the raised position as shown in FIGURE 1, it is first necessary to position these ramps in the lower load supporting position illustrated by ramps 46, 48 and 60 in FIGURE 1. This is accomplished in the following manner: The operator depresses appropriate locking bar 98 associated with one of the ramps 50 or 52 by applying foot pressure to pedal 112 at which time the ramp may be manually rotated 90° to the lower load supporting position. As the ramp is lowered, channel member 124 engages angle member 132 secured to upper ramp 64 and cams it downwardly until the outer ends of box beam 70 rest on the upper surfaces of brace members 38 and one end of pin 128 engages in hole 130. The latching mechanism associated with the other of the ramps 50 and 52 is then released and the ramp is lowered in a similar manner to engage the upper rear surface of the upper ramp. It will be noted that the weight of one of the longitudinally inclined ramps engaging the upper ramp is sufficient to overcome the counterbalancing force applied thereto and lower the upper ramp. With the ramps in the lower load supporting position they intersect the path of automotive movement defined between support members 26 and 28 and define a path of automotive wheel travel between the lower and upper parking levels. The procedure just described requires only a few seconds because it is unnecessary to move the ramps slowly. In actual practice the first longitudinally inclined ramp is pulled in the appropriate direction and allowed to fall on the upper ramp to lower the same. Similarly, to again raise the ramps it is only necessary to pick up one of the ramps 50 or 52 and rotate it upwardly 90° until it is automatically latched at which time the other ramp is thrown up and the upper ramp 64 is raised automatically due to the counterbalancing effect of weights 78. The bias of counterweights 58 and 78 is so selected as to require very little effort to manipulate the ramps. In actual practice all of the necessary movements are easily performed with one hand. It will be apparent that when the three ramps associated with each adjacent pair of support members are in the raised position, they no longer intersect the automotive path of movement defined between such members and another automobile may be driven between the support members and associated raised ramps to park directly beneath an automobile previously parked on the upper level. Another automobile may then be parked between the inclined frame members 32.

As previously described, each ramp 46, 48, 50, 52 is provided with wheel track engaging surfaces on opposite sides thereof and can be pivoted 90° in either direction from the raised position illustrated by ramps 50 and 52, in FIGURE 1, to cooperate with a different adjacent ramp on either side thereof to provide an automotive path of wheel travel between the lower and upper levels.

With the ramps in the lower position an automobile may be driven over the upwardly facing wheel track supporting surfaces 116, 118, 68 provided by ramps 46, 48, and 60 as illustrated by car 134 shown in phantom lines in FIGURE 1. After reaching the upper level the operator steps out onto the catwalk 136 and walks back alongside the car and down the ramps. The operator then raises the ramps and parking spaces on lower level 14 are available for use as though the support structure were not present.

To remove a car 135 from an elevated location, it is necessary to move the car parked between the raised ramps. The ramps are then lowered, the operator walks up the ramps and along the catwalk to enter the car and back the same down the same ramps.

One of the outstanding features of the invention is the great saving in cost which is made possible by the fact that each lower ramp can be used by more than one car. Thus, by pivoting ramp 48 clockwise, as viewed in FIGURE 1, through 180° and pivoting ramp 50 counter-clockwise through 90°, these two ramps which were previously traversed on one side by cars 134 and 135 may then be traversed by a third car to reach elevated location 18.

It is an important feature of the invention that the upper parking level may be extended to any desired length in the direction of automotive travel. Parking locations 136, 138, and 140, fragmentarily shown in FIGURE 1, are illustrative of the manner in which the upper level may be extended. Thus the upper level might be designed to support ten cars parked ten deep in which event all of the cars would be driven up the same set of three ramps and parked one behind the other. When the ramps are raised ten other cars could be parked directly beneath the elevated cars and one more parked between the raised ramps thus increasing the parking capacity of a particular long lane from 11 cars to 21 cars.

Another outstanding feature of the invention from the standpoint of cost is the ease of fabrication and erection. Any number of the support means 22, 24, 26, 28 may be assembled with its longitudinally inclined ramp for shipment to the site of installation along with the prefabricated upper ramps and upper levels which are then completely assembled at the site merely by bolting the upper level to the support members and inserting the hinge pins between the upper ramps and the upper support level. The on-site assembly requires only a few minutes and disassembly for movement to a different location is accomplished with equal facility.

It is, of course obvious that the upper ramps 60, 62, 64 could be dispensed with and the longitudinally inclined ramps supported directly between the upper and lower parking levels. Such a modification of the invention results in a longer overall structure than that illustrated in the drawings because the upper support level would have to extend far enough behind the rear of an automobile that the ramps could be rotated to a raised position without striking the undercarriage of the automobile. In such a construction, the upper ends of the inclined ramps would overlie the rear edge of the upper support level in substantially the same manner that they overlie the rear edges of the upper ramps in the attached drawings.

I claim:
1. Automotive parking structure comprising; a plurality of transversely spaced support means extending upwardly from a first parking level and defining a longitudinal path of automotive movement between each adjacent pair of support means, each adjacent pair of support means supporting an upper parking level in spaced superposed relation to a first portion of said path of automotive movement, ramp means for providing a longitudinally inclined path of automotive wheel travel between each adjacent pair of support means extending from said lower level to each upper level, said ramp means being mounted on said parking structure for movement into and out of a second portion of said path of automotive movement, said ramp means including a ramp associated with each of said support means, and means mounting each said ramp on said parking structure for movement between adjacent paths of wheel travel on opposite sides of said support means.

2. The parking structure of claim 1 wherein said means mounting each said ramp on said parking structure includes pivot means defining a longitudinally inclined pivot axis.

3. The parking structure of claim 2 wherein said pivot means interconnect each said ramp with its associated support means.

4. The parking structure of claim 1 wherein said ramp means are mounted on said parking structure by pivot means.

5. The parking structure of claim 4 wherein said pivot means include a transverse pivot axis and a longitudinally inclined pivot axis.

6. The parking structure of claim 5 including means biasing said ramp means for movement about said pivot means.

7. The parking structure of claim 5 including means biasing at least one of said ramps for movement about said transverse pivot means.

8. The support structure of claim 1 wherein each said ramp includes two wheel engaging track surfaces positioned for selective upward disposition in said adjacent paths of wheel travel.

9. The support structure of claim 1 wherein said upper parking level includes a plurality of longitudinally aligned parking locations overlying each said path of automotive movement.

10. Automotive support structure comprising; means defining transversely spaced parking locations on a lower level and supporting elevated parking locations thereabove, means for providing transversely spaced paths of travel between said lower level and each elevated location including a ramp associated with each elevated location mounted on said structure for movement into and out of adjacent paths of travel.

11. Automotive support structure comprising; means defining transversely spaced parking locations on a lower level and providing elevated parking locations thereabove, means for providing inclined paths of automotive travel between said lower level and the elevated parking location said means including two ramps each having two wheel engaging track surfaces, and means mounting said ramps on said support structure for movement between a first position in which one of said track surfaces on each of said ramps is upwardly disposed to define one of said paths of automotive travel and a second position in which the other of said track surfaces on each of said ramps is upwardly disposed to cooperate with the track surfaces of other ramps to define additional paths of automotive travel transversely spaced on either side of said path of travel.

12. Automotive support structure comprising; transversely spaced support members extending upwardly from a lower parking level supporting an upper parking level in spaced superposed relation to paths of automotive movement defined between adjacent pairs of support members, means for providing longitudinally inclined paths of automotive wheel travel between said lower and upper levels, said means including a ramp having two wheel engaging track surfaces associated with each of said support members, and means mounting said ramps on said support structure for movement between a first position on one side of said members in which one of said track surfaces is upwardly disposed to lie within one inclined path of wheel travel and a second position on the other side of said members in which the other of said track surfaces is upwardly disposed to lie within another path of wheel travel.

13. Automotive support structure comprising; transversely spaced frame members extending from a lower parking level supporting an upper parking level in spaced superposed relation to paths of automotive movement defined between adjacent pairs of frame members, means providing longitudinally inclined paths of automotive wheel travel between said lower and upper levels, said means including a plurality of ramps each having opposite faces defining wheel engaging track surfaces, pivot means defining longitudinally inclined pivot axis interconnecting one of said ramps with each of said frame members for movement between a first position on one side of said members in which one of said track surfaces is upwardly disposed to lie within one inclined path of travel and a second position on the other side of said member in which the other of said track surfaces is upwardly disposed to lie within another inclined path of travel.

14. Automotive support structure comprising; transversely spaced frame members extending upwardly from a lower parking level supporting an upper parking level in spaced superposed relation to paths of automotive movement defined between adjacent pairs of frame members, means providing longitudinally inclined paths of automotive wheel travel between said lower and upper levels, said means including a ramp having two wheel engaging track surfaces associated with each of said frame members, and means mounting each of said ramps on said support structure for movement of respective ones of said track surfaces between adjacent paths of wheel travel.

15. Automotive support structure comprising; transversely spaced frame members extending upwardly from a lower parking level supporting an upper parking level in spaced superposed relation to paths of automotive movement defined between adjacent pairs of frame members, means providing longitudinally inclined paths of automotive wheel travel between said lower and upper levels, said means including a ramp having two wheel engaging track surfaces associated with each of said frame members, and means mounting said ramps on said support structure for movement between a first position on one side of said members in which one of said track surfaces is upwardly disposed and a second position on the other side of said members in which the other of said track surfaces is upwardly disposed.

16. Automotive support structure comprising; first means providing two transversely spaced automotive storage locations at a first level elevated above a second level; and second means providing longitudinally inclined paths of automotive wheel travel between the first and second levels, the second means comprising a ramp having opposite faces defining wheel engaging track surfaces; and means mounting the ramp for pivotal movement from a first position defining a first path of automotive wheel travel with one of the wheel engaging track surfaces to one of the automotive storage locations to a second position defining a second path of automotive wheel travel with the other of the wheel engaging track surfaces to the other of the automotive storage locations.

17. Automotive parking structure comprising; a plurality of transversely spaced support means extending upwardly from a first parking level and defining a longitudinal path of automotive movement between each adjacent pair of support means, each adjacent pair of support means supporting an upper parking level in spaced superposed relation to a first portion of said path of automotive movement, ramp means for providing a longitudinally inclined patht of automotive wheel travel between each adjacent pair of support means extending from said lower level to each upper level, pivot means mounting said ramp means on said parking structure for movement into and out of a second portion of said path of automotive movement, said ramp means including a ramp having two wheel engaging track surfaces associated with each of said support means, and said pivot means including pivots mounting each said ramp on its associated support means for movement between adjacent paths of wheel travel on opposite sides of said support means.

References Cited
UNITED STATES PATENTS 2,717,428    9/1955    White _____ 52—175

FRANK L. ABBOTT, *Primary Examiner.*

P. C. FAW, *Assistant Examiner.*

U.S. Cl. X.R.

14—71; 214—16.1